United States Patent [19]
Joseph

[11] Patent Number: 5,873,106
[45] Date of Patent: Feb. 16, 1999

[54] GEOMETRY MANAGEMENT FOR DISPLAYING OBJECTS ON A COMPUTER

[75] Inventor: Joshy Joseph, Union City, Calif.

[73] Assignee: Oracle Corporation, Redwood Shores, Calif.

[21] Appl. No.: 531,146

[22] Filed: Sep. 18, 1995

[51] Int. Cl.⁶ ................................................ G06T 1/00
[52] U.S. Cl. ................... 707/506; 707/517; 707/509; 345/433; 345/339
[58] Field of Search ..................... 395/778, 123, 395/761, 763–771, 779–783, 333–334, 339; 707/500, 505–510, 520, 517, 518, 519; 345/342, 433, 339, 348–349, 333–335

[56] References Cited

U.S. PATENT DOCUMENTS

| | | | |
|---|---|---|---|
| 5,001,697 | 3/1991 | Torres | 395/149 |
| 5,140,677 | 8/1992 | Fleming et al. | 395/159 |
| 5,227,771 | 7/1993 | Kerr et al. | 340/731 |
| 5,428,729 | 6/1995 | Chang et al. | 395/159 |
| 5,438,660 | 8/1995 | Lee et al. | 395/155 |
| 5,455,599 | 10/1995 | Cabral et al. | 345/133 |
| 5,506,962 | 4/1996 | Choy et al. | 395/159 |
| 5,550,969 | 8/1996 | Torres et al. | 364/159 |
| 5,581,686 | 12/1996 | Koppolu et al. | 395/340 |

OTHER PUBLICATIONS

Phillip Robinson, "Parametric and Variational CAD System", Computer Graphics World, Apr. 1989, vol. 12, pp. 117, 118 and 121.

*The Definitive Guides to the X Window System*, vol. Four, Motif Edition, X Toolkit Intrinsics Programming Manual for OSF/Motif Version 1.1, Chapter 12, Table of Contents, Author: Dan Heller, O'Reilly & Associates, Inc.

*The Definitive Guides to the X Window System*, vol. Six, Motif Edition, Motif Programming Manual for OSF/Motif Version 1.1, Chapter 8, Table of Contents, Author: Dan Heller, O'Reilly & Associates, Inc.

*Primary Examiner*—Joseph H. Feild
*Attorney, Agent, or Firm*—Fliesler, Dubb, Meyer & Lovejoy LLP

[57] ABSTRACT

A geometry management system provides an initial bottom-up layout that determines the ideal and default sizes of objects including the pages, views, and frame windows. The geometry management system further includes a top down configuration to handle resizing of a window including the objects contained in the window. The geometry management system includes geometry manager objects, container objects, and child objects. At design or layout time, the child objects are placed in a parent container via a drag and drop operation. The geometry management system specifies size parameters through negotiation among the child objects, the containers, and the high level geometry manager. When a child object requires resizing, the child object requests geometry from the parent container object. Based on the specified parameters, the container determines whether a given geometry is feasible. If the parameters are acceptable, the container implements the geometry. The container may be bound to a geometry manager that implements an overall geometry management policy for the display.

25 Claims, 7 Drawing Sheets

GEOMETRY MANAGEMENT FOR DISPLAYING OBJECTS ON A COMPUTER

FIELD OF THE INVENTION

The present invention relates to the field of displaying text and graphics on a computer output display, and more particularly to geometry management of objects for display.

BACKGROUND OF THE INVENTION

As a means for providing information to a user, a computer program, operating on a computer system, displays textual and graphical information on an output display. The textual and graphical information may be displayed in a variety of forms. For example, a display may include graphics as well as some textual data displayed within the graphics. Also, in a computer system that operates in a windows system environment, the display of the textual and graphical information is often confined within a specific window.

Figure 1A:
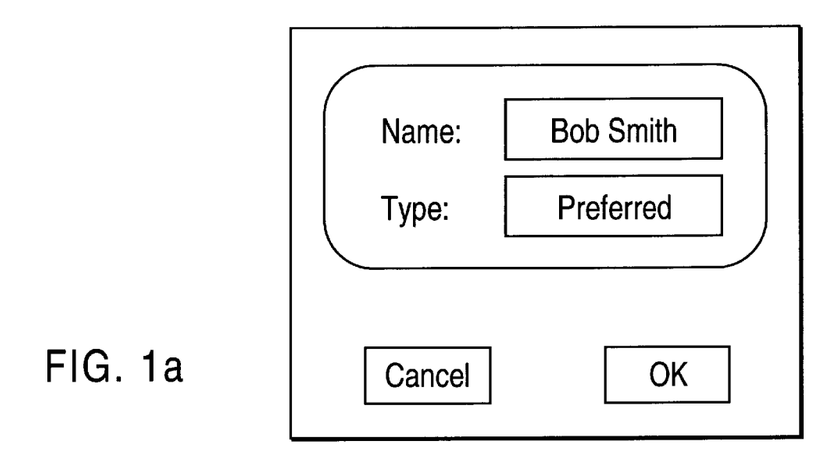
FIG. 1a illustrates an example display form that includes both textual and graphical data.

One problem associated with displaying textual and graphical information is the spacing among different portions of the text and/or graphics as well as the layout or spacing within the window. FIG. 1a illustrates an example display form that includes both textual and graphical data. Specifically, an example form includes a rectangle with rounded edges that further includes text and two rectangles. Furthermore, the rectangles contain text. Also, the bottom of the example form includes two rectangles, wherein each rectangle contains text. For the example form, there are several geometric constraints or requirements for properly rendering the form. For example, the text "Name:" and "Type:" are contained within the outer rounded edged rectangle, and the text "Bob Smith" and "preferred" are contained within the inner rectangles. Similarly, the text "cancel" and "OK" are bounded within rectangles.

Figure 1B:
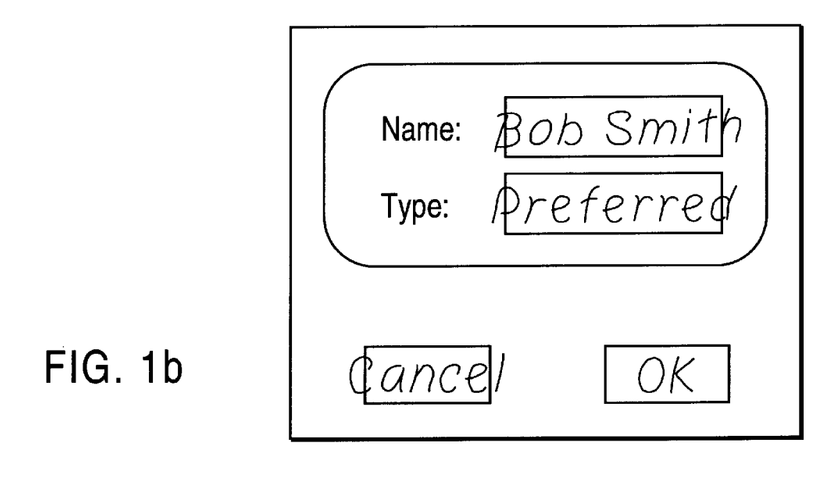
FIG. 1b illustrates the example form of FIG. 1a with the text in the form changed to a different font.

Typically, to generate such a form, a user, through use of a form building program, specifies these geometric relationships. However, as any number of factors change, the spacing of both the text and graphics may also change. If this occurs, the user is required to re-layout the form to accommodate the change. For example, if the form is rendered using a different text string (e.g. a foreign language), then the spacing of the text within the rectangular boxes may become skewed. FIG. 1b illustrates the example form of FIG. 1a with the text in the form changed to a different font. As shown in FIG. 1b, the form requires re-layout because the rectangular boxes encapsulating the text are no longer large enough for the text. Because many factors that affect the spacing of a display may change, it is desirable to provide a system that manages the layout displays. The ability to coordinate the spatial relationships among textual and graphical objects in a display is known as geometry management.

SUMMARY OF THE INVENTION

The geometry management system provides an initial bottom-up layout that determines the ideal and default sizes of objects including the pages, views, and frame windows. The geometry management system further includes a top down configuration to handle resizing of a window including the objects contained in the window. The geometry management system includes geometry manager objects, container objects, and child objects. At design or layout time, the child objects are placed in a parent container. If the container is a non-configurable container, then the container implements a geometry management policy to manage the child objects within the container. Container and child objects may include any type of graphical artwork including a polygon, an arc, and an ellipse. For example, the container object may be a circle, and the child object may be a text string, and the geometry management policy may be to configure the circle large enough to encapsulate the child object text. If the container is a configurable container, then the container and the corresponding child objects are managed via a geometry manager that implements a geometry management policy.

At an initial design time, a user enters user preferences and geometry constraints to define the relationships among the objects. In the preferred embodiment, the user executes a drag and drop operation and an alignment operation to create persistent geometry management constraints that are active at run time as well as design time. For example, through use of the drag and drop operation, the user places child objects into parent containers. In response to the user operation, the geometry management system configures the child object within the parent container such that the appropriate geometry management methods are executed. The drag and drop design methodology executed by the user at design time provides direct feedback of the geometry management to a user.

In operation, the geometry management system specifies size parameters through negotiation among the child objects, the container objects, and the high level geometry manager objects. The geometry manager objects are independent of specific containers such that the geometry management objects may be attached to any configurable container. The container, and not the child object, has final control over the geometry of the child object. When a child object requires resizing, the child object requests geometry from the parent container object. Based on the specified parameters, the container determines whether a given geometry is feasible. If the parameters are acceptable, the container implements the geometry. A child object is bound to blindly accept the geometry.

Other features and advantages of the present invention will be apparent from the accompanying drawings, and from the detailed description that follows below.

BRIEF DESCRIPTION OF THE DRAWINGS

The features and advantages of the present invention will be apparent from the following detailed description of the preferred embodiment of the invention with references to the following drawings.

DETAILED DESCRIPTION

Geometry Management Methodology

The geometry management system provides an initial bottom-up layout that determines the ideal and default sizes of objects including the pages, views, and frame windows. At layout time, a user enters user preferences and geometry constraints to define the relationships among the objects. The user preferences may include language for text strings, alignment of objects, etc. Based on the user preferences and constraints, the frame windows are configured at startup time to achieve the appropriate geometry. Consequently, the initial bottom up layout approach to geometry management provides a system that is readily manageable.

The geometry management system further includes a top down layout to handle resizing of a frame window by a user. For example, if a user resizes a frame window, then the geometry management system re-configures the objects contained in the window appropriately. A third type of layout supported by the geometry management system is a dynamic re-layout. In a dynamic re-layout, the size of one or more objects are changed at run time due to a variation in one or more parameters that affect the geometry management of the layout.

The geometry management system includes a general and extensible framework including a fairly comprehensive set of built-in objects. The built-in objects permit geometry management solutions for a comprehensive set of geometry management problems. The built-in objects operate in the overall framework of the geometry management system. In addition to the built-in objects, the framework of the geometry management system supports add-on geometry managers. The add-on geometry manager facility supports user defined geometry managers that have specialized requirements. In addition to the flexibility, the geometry management system provides appropriate visual layout mechanisms during design time. Typically, a user develops a layout for display during design time, but only receives feedback on the display of the layout subsequently during run time. The geometry management system visual layout mechanisms permit a user to receive direct feedback when generating a display.

The geometry management system supports add on customized geometry managers. In one embodiment, the geometry managers are separated from visual containers to enable mixing and matching of geometry managers with different visual containers. For example, the matrix geometry manager may manage child objects of a circle object, a rectangular object, an elliptical object, etc. For purposes of explanation, containers that support dynamic binding to geometry managers are called configurable containers. In a typical implementation, most of the containers are configurable containers. Containers may exhibit a simple geometry management scheme. For example, the size of the container may be configured such that the external parameters of the container are the smallest possible to encapsulate the child objects. In general, every container contains layout management built into the container. For configurable containers, the layout management policy is determined by the geometry manager bound to the container. Non configurable containers are governed by the corresponding geometry management scheme implemented for the non configurable container.

Figure 2:
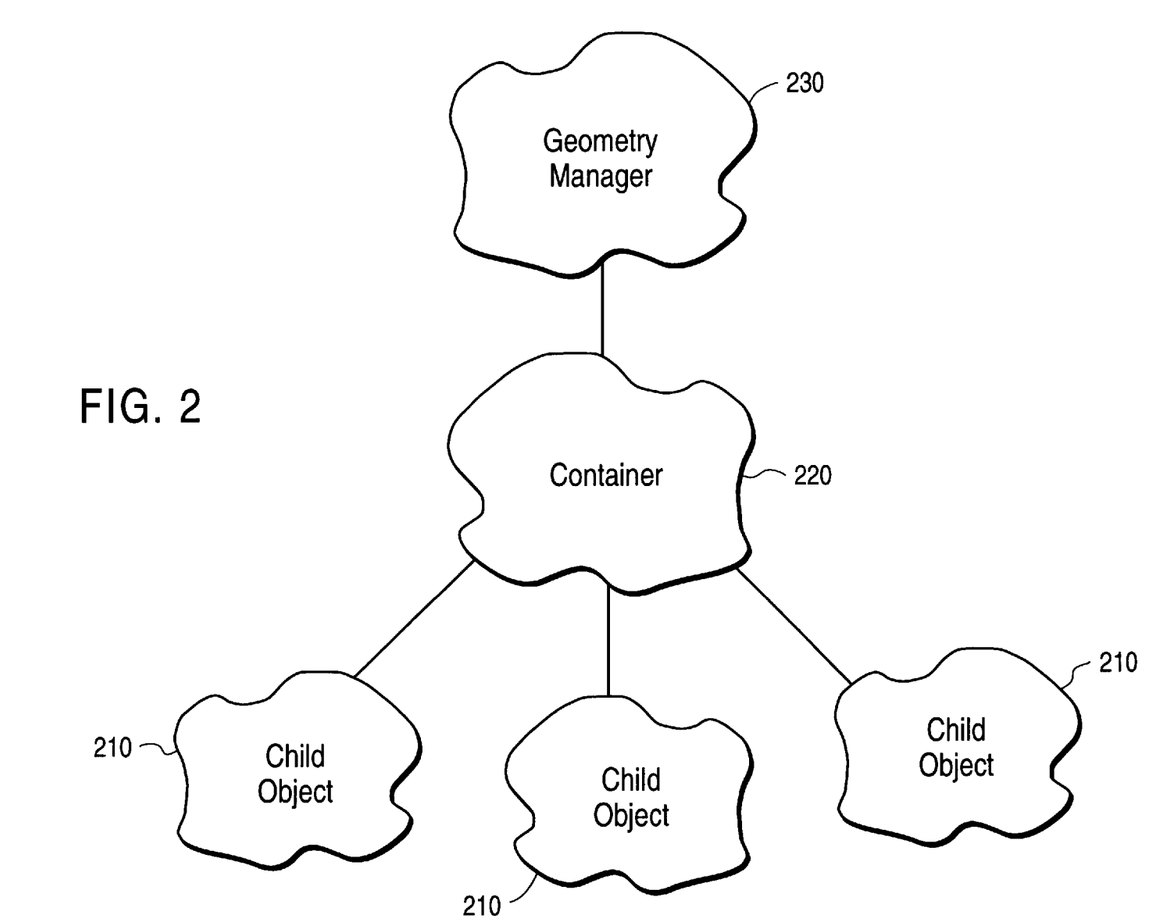
FIG. 2 conceptually illustrates one embodiment for the geometry management system of the present invention.

FIG. 2 conceptually illustrates one embodiment for the geometry management system of the present invention. Specifically, the example geometry management system includes a plurality of child objects, each labeled 210, a container 220, and a geometry manager 230. FIG. 2 illustrates an example relationship among geometry managers, containers and child objects, however, a geometry management implementation may contain any number of child objects managed by one or more containers. In turn, the one or more containers may be managed by one or more geometry managers. For this example configuration, the container 220 is a configurable container managed by the geometry manager 230.

The child objects 210 have geometric requirements imposed at design time or in response to a parameter change (e.g. the length of a character string changes). To obtain a geometry, the child objects 210 specify their geometry management preferences to the container 220. In turn, the container 220, if a configurable container, communicates with a geometry manager 230 that implements the overall geometry management policy. As shown in FIG. 2, the relationship among child objects, containers and geometry managers is hierarchical. For this implementation, the geometry management calls from container 220 to geometry manager 230 is transparent to the child objects 210. Although a child object may specify a preference, the container/geometry manager dictates the geometry of the child object.

In a preferred embodiment, the layout management methods between the container 220 and the geometry manager 230 are collected into a single interface, entitled ISULayoutManagement. The ISULayoutManagement interface is exposed by containers as well as geometry managers. For this embodiment, and as explained more fully below, container and geometry management specific methods are contained in ISUContainer and ISUGeometryManagement, respectively.

Prior to design, a user specifies constraints that define relationships for the display layout. For example, if a user desires to left justify all objects contained in a particular column, then the user specifies this as a constraint. A constraint may be related directly to a child object, or it may be a global constraint implemented at the geometry management level. In general, geometry managers have per child geometry constraints specified in addition to the global constraints. However, as discussed above, in the geometry management system framework, the child objects are geometry managed by a parent container, and they are not determined by the geometry manager. To implement per child geometry constraints at the geometry manager level, the geometry management system contains a layout constraints attribute. The layout constraints attribute is set by parent container objects when a child object is inserted therein. Thus, the attributes exposed by the child object via the layout constraints attribute are determined by the appropriate container/geometry manager.

In operation, the geometry management system specifies parameters through negotiation among the child objects, the containers, and the high level geometry manager. The basic underlying principle in the geometry management system is that the container, and not the child object, has final control over the geometry of the child object. When a child object requires resizing, the child object calls a RequestGeometry method contained in the corresponding container object. For example, to set the inner width and outer height of an object, the child object calls the RequestGeometry in the container object. Based on the specified parameters, the container determines whether a given geometry is feasible. If the parameters are acceptable, the container implements the geometry by calling the TakeGeometry method contained in the child object. A child object is bound to blindly accept the geometry passed to the TakeGeometry method by the container.

In the preferred embodiment, a child may express preferences via the layout constraints attribute, the minimum and maximum attributes for inner and outer sizes, and via implementation of a QueryGeometry method. However, there is no guarantee that the container will honor the preferences specified by the child object.

In general, frame windows, which display geometry managed forms, contain one or more views. In addition, the views observe one or more pages of the forms. The geometry of a frame window is determined from the views contained in the frame window. In addition, the geometry of a view requires synchronization with the geometry of the pages observing the view. Furthermore, the geometry of the page is determined from the objects included in the page, and the geometry of a particular object is synchronized across all views that observe the page containing that object.

These relationships among frame windows, views, pages and objects present two geometry management problems. First, a page may be observed by multiple views, and the multiple views may differ in size. Therefore, the geometry of a page and the objects contained within the page may be different for different views. However, in the geometry management system, the geometry of objects is always synchronized across views. To accomplish this, the geometry management system is configured such that a page is geometry managed by one of the views observing the page. Therefore, not all pages observed by a view require geometry management. Instead, only the managed pages are part of the view-page geometry synchronization. In addition to the multiple view and page synchronization problem, a view may be managing multiple pages that differ in size. For this scenario, the ideal size of the view is determined by computing the maximum of the widths and heights of the pages that the view currently manages.

In one embodiment, the user executes a drag and drop operation at design time to layout a form. As described below, the built-in objects contain a plurality of cells. For example, a matrix object contains, at design time, a plurality of cells arranged in rows and columns. To lay out a form, a user, via a cursor control device, selects a child object, drags the child object over a selected cell, and drops the child object into the cell. The child objects may be selected for inclusion in a cell through any well known user interface method. In response to the user operation, the geometry management system configures the child object within the parent container such that the appropriate geometry management methods are executed. The drag and drop design methodology executed by the user at design time provides direct feedback of the geometry management to a user. Geometry managers and containers implement a function, entitled the ISUDropTargetInterface, to provide visual feedback when an object is dragged over cells in a layout form. The visual feedback identifies to the user the cell that will contain the child object if the child object is dropped.

Built-in Objects for Geometry Management

In a preferred embodiment, the geometry management system contains a comprehensive set of built-in geometry management objects to cover a wide variety of geometry management scenarios. In general, the built-in objects may be characterized as four types: geometry managers, configurable containers, non configurable containers, and place holders. An example geometry manager includes a matrix. The configurable containers, which are most of the containers in a system, include such objects as container rectangle, a container circle, a container ellipse, etc. A row column object, which is a non configurable container, controls the arrangement of a child object as either a single row or column based on the row column object's IsVertical attribute. The placeholder object, which is neither a container nor a geometry manager, is an object that operates as a placeholder. The placeholder object does not have a visual rendering at run time, but is used during layout as is described more fully below.

In general, the matrix object is a geometry manager that provides functionality to layout or build a geometry managed form containing rows and columns. Each row of the matrix object contains one managed child object. The managed child object may be any object, including a container. Each managed child object is associated with one and only one cell in the layout form. Each row and column contains an alignment attribute. The value of the alignment attribute may be set to center, top left, bottom right, or both. To override default alignment for a cell, a managed child sets the vertical alignment and the horizontal alignment attributes at the child level via the child's layout constraints object. Although the geometry management framework specifies that a child is associated with a single cell, a child may overflow into neighboring cells. To control the overflow, an CanOverflow attribute is included on the child's layout constraints object.

The layout method implemented in the matrix object includes determining the minimum/maximum width/height of a column/row by utilizing the maximum/minimum of the minimum/maximum width/height of the children in that column/row. Similarly, ideal width/height of a column/row is determined as a combination of the ideal width/heights of the children in the column/row. The minimum, maximum and ideal width and height of the matrix itself is determined from the values of the cells and columns. This scheme is altered to handle child objects that overflow into neighboring cells.

Figure 3:
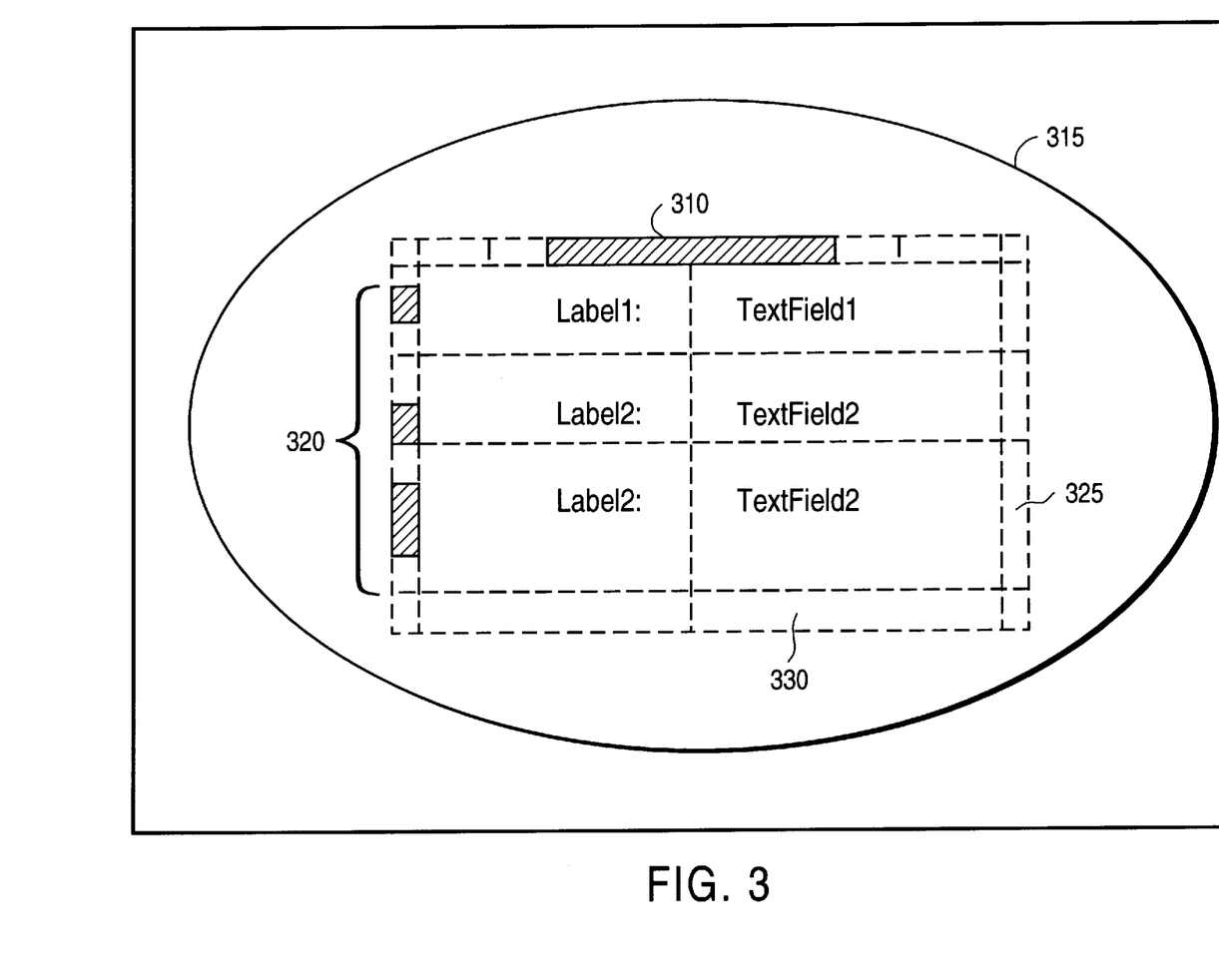
FIG. 3 illustrates a design time appearance of an ellipse container object geometry managed by the matrix object.

FIG. 3 illustrates a design time appearance of an ellipse container object geometry managed by the matrix object. As shown in FIG. 3, the container is rendered as an ellipse 315. The ellipse container 315 includes a plurality of cells used to layout the column and rows. The cells are delineated by a dashed lines. The layout form further includes, at the top and at the left, columns and row headers 310 and 320, respectively. The column and row headers 310 and 320 are utilized to set the row and column alignments. As shown in FIG. 3, each row/column header is divided into three cells corresponding to top left, center, and bottom right alignment values. In one embodiment, the user, through use of a cursor control device, "clicks" on a cell to toggle the value. Both of the top left and bottom right cells may be activated at the same time. If the center value is turned on, both the top left and bottom right cells are turned off. Furthermore, if the user does not specify a value for the header cells, then the center value is activated.

The cells at the right and bottom labeled 325 and 330, respectively, on FIG. 3, operate as placeholders for entering a new row or column. In order to add a new row or column, a user drops objects into the placeholders 325 or 330 to create positions in the matrix. The empty row or column may be dragged and dropped into the middle of the matrix to insert a new row or column. Also, objects may be dropped and dragged in the middle of the matrix to create a new column or row. As discussed above, to insert an object into the matrix, the object is dragged and dropped into the appropriate cell of the matrix. The use of the cells 325 and 330 for layout results in a slight increase in the total number of space available for the child objects at run time. However, this is a minor cost as compared to the utility gained through use of the cells 325 and 330.

Figure 4:
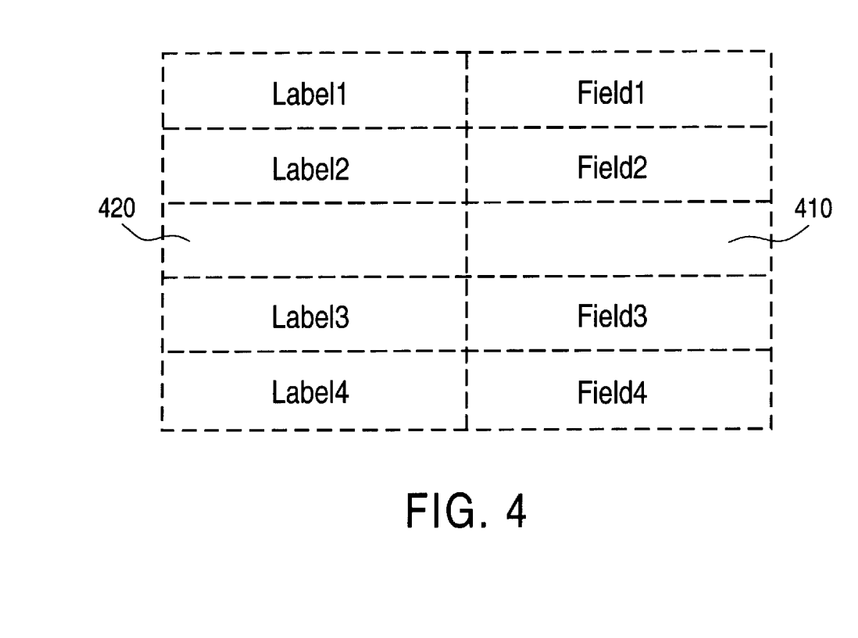
FIG. 4 illustrates an example matrix that uses a placeholder object.

The placeholder object generates a space to preserve a user specified distance among other objects. Although the placeholder is represented in the design layout, it does not have a run time visual representation. The placeholder object may be utilized in several situations, and it may be used in conjunction with other geometry management objects. FIG. 4 illustrates an example matrix that uses the placeholder object. For the example matrix illustrated in FIG. 4, the geometry management constraints require that label 3 and label 4 are aligned with label 1 and label 2. An additional constraint is that a distance, approximately between 20 and 60 units, but ideally 40 units, is generated between label 2 and label 3 and between field 2 and field 3. In order to accomplish this, the user inserts a cell to generate a row between label 2 and label 3. In addition, the user drops a placeholder object, which is an instance of the CSU placeholder, in a cell of a newly created row. The cells that contain the placeholder objects are labeled 410 and 420 on FIG. 4.

In one embodiment, the geometry management system includes a row/column geometry manager. The row/column geometry manager, entitled CSU row/column, is a nonconfigurable container. Specifically, the CSU row/column geometry manager implements a geometry management scheme that arranges all managed children in a single row or column. When utilizing the CSU row column geometry manager to layout a row, all managed children have the same height. Similarly, when laying out as a column, all managed children have the same width.

The CSU row/column geometry manager contains an InterCellDistance and IsButton group attributes. The InterCellDistance and IsButton group attributes permit a more advanced use of the CSU row/column geometry manager. Specifically, the InterCellDistance attribute may be utilized to add a fixed distance between adjacent cells in a row or column. When the IsButton group attribute is activated, the row/column objects acts as a button group. In a button group, all child objects exhibit the same width and height. Because of this, the width/height is determined as the minimum of the ideal width/heights of all of the managed child objects. In a typical implementation, the IsButton group attribute is utilized to size the buttons on a form so that all of the buttons have the same size and have their text fully visible.

Figure 5:
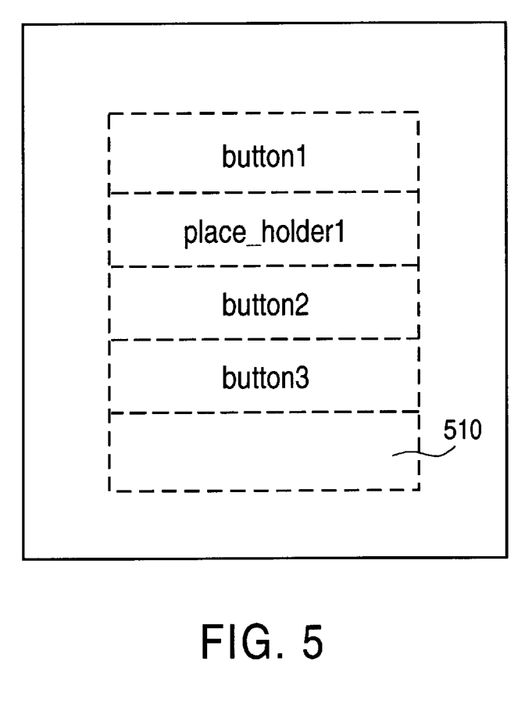
FIG. 5 illustrates an example layout utilizing a row/column container object.

FIG. 5 illustrates an example layout utilizing the CSU row/column object. The example illustrated in FIG. 5 represents a form at design time, wherein the IsVertical attribute is set to indicate a column. The empty cell located at the bottom of the form, labeled cell 510 on FIG. 5, is utilized for adding a new child object. In addition, the empty cell may be dragged and dropped between other cells in the column. Also, the IsButton group attribute is set so that the size of the buttons "1", "2", and "3" are equivalent.

Figure 6A:
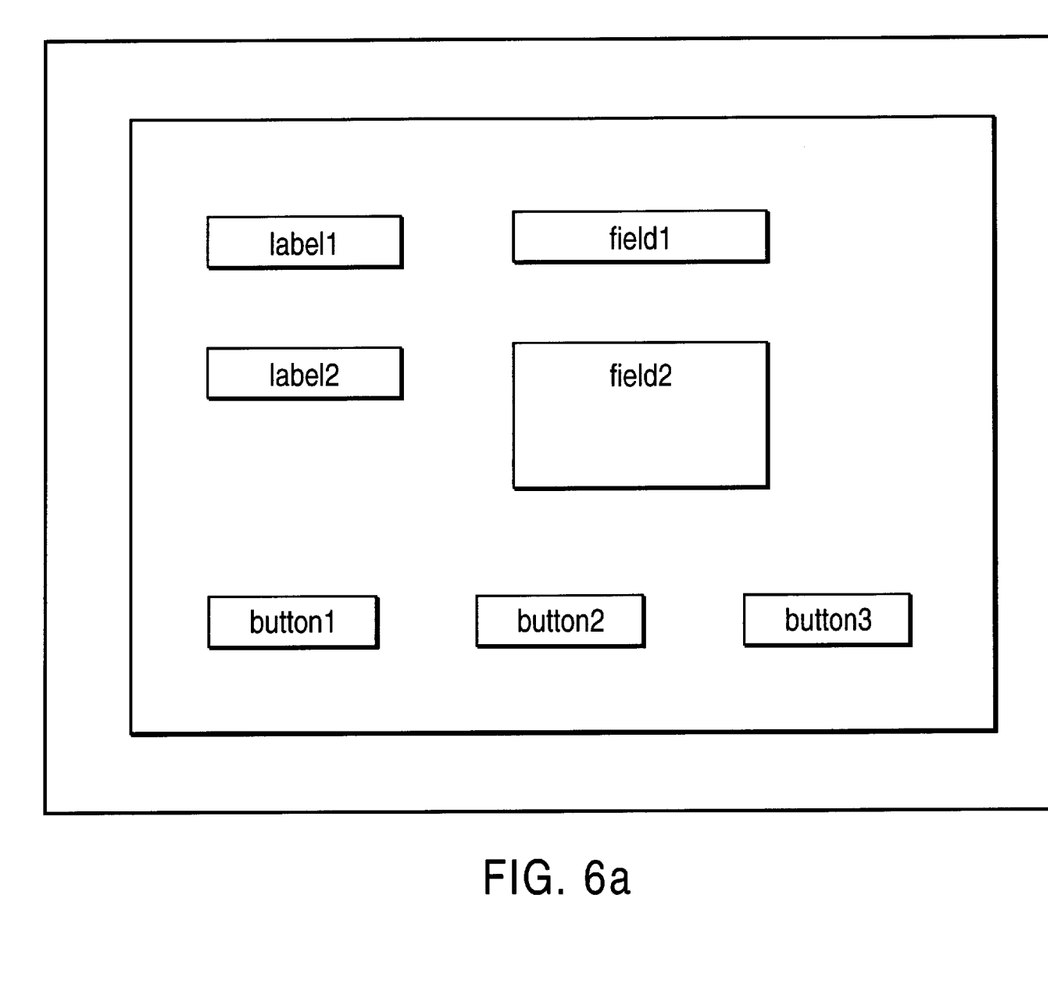
FIG. 6a illustrates an example form at run time.
Figure 6B:
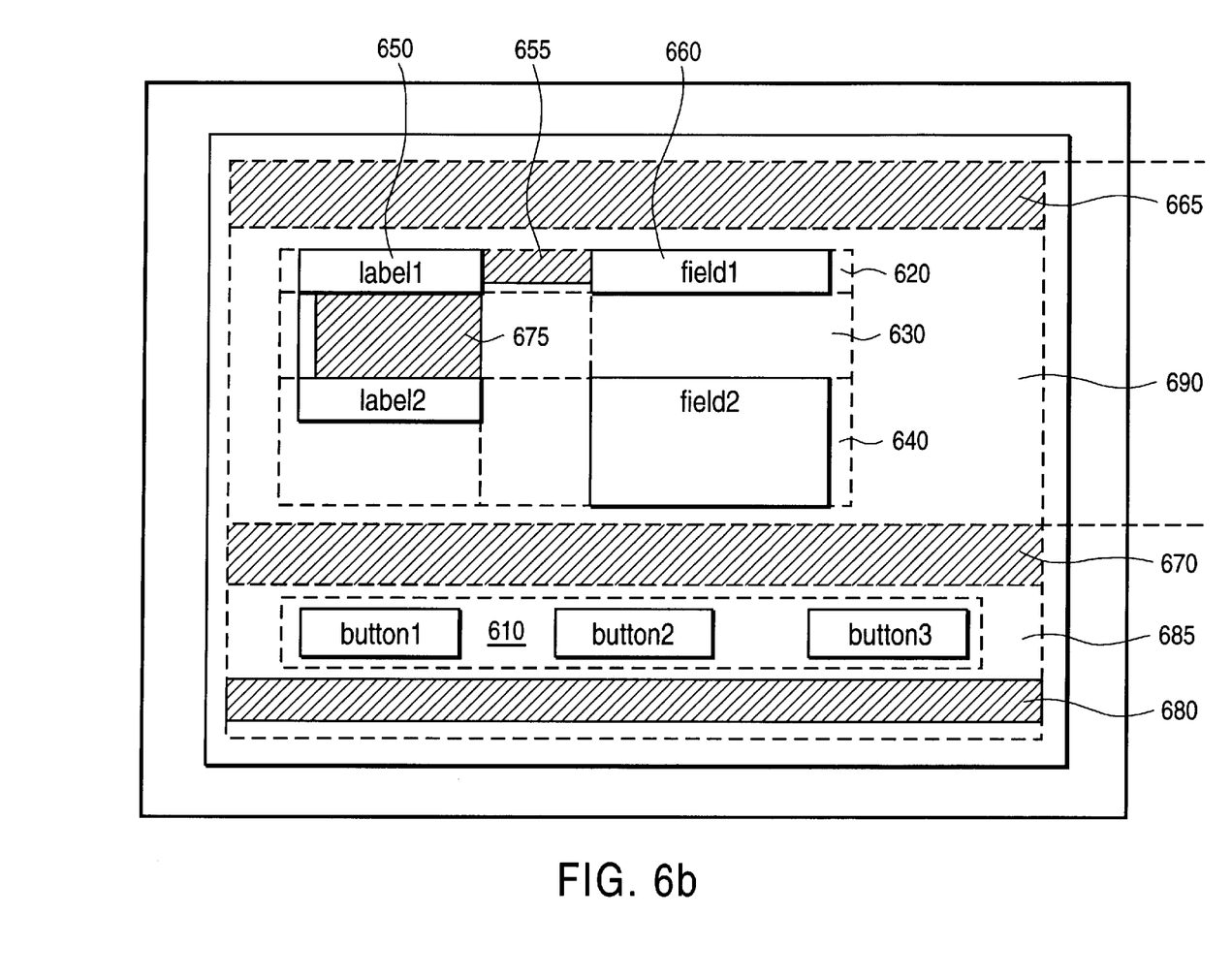
FIG. 6b illustrates the example form shown in FIG. 6a during design or layout time.

FIGS. 6a and 6b illustrate an example form that is geometry managed utilizing the built-in geometry manager objects. Although the example form illustrated in FIGS. 6a and 6b is generated using the built-in objects described above, other objects may be utilized within the framework of the geometry management system. FIG. 6a illustrates the example form at run time. Table 1 contains the constraints for the example form.

TABLE 1 a) Label1 and label2 are right aligned.
b) Field1 and field2 are left aligned.
c) Label1 and field1 are aligned at the top.
d) Label2 and field2 are aligned at the top.
e) Label1 and label2 are separated by a fixed distance of 10 units.
f) Label1 and field1 are separated by a fixed distance of 10 units.
g) Button1, button2, and button3 act as a single button group in that all of they all have the same width and height and all the text is fully visible.
h) The three buttons are at least 20 units away from field2.
i) The three buttons are at least a fixed distance of 10 units from the bottom of the form.
j) Label1 is at least 20 units away from the top edge of the form.

In one embodiment, the layout requirements "a–f" are implemented using a CSU matrix object including the addition of CSU placeholder objects that add distance between rows and columns. Requirement "g" is met by using the CSU row/column object with the Isbutton group attribute set to an active state. Requirements "h–j" are met by using a CSU placeholder object each in conjunction with a single CSU row/column object. The single row/column is the only child of the page and, by default, the page exhibits a geometry management scheme to accommodate the size of the child objects. For the example illustrated in FIGS. 6a and 6b, the example form contains a single frame window with a single view that observes a single page. Consequently, once the page is fully geometry managed, then the form is fully geometry managed as well.

FIG. 6b illustrates the example form during design or layout. The area labeled 610 in FIG. 6b, which contains "button 1", "button 2", and "button 3", is implemented utilizing the CSU row/column that acts as a button group. The CSU matrix object was utilized to generate columns 650, 655, and 660, as well as rows 620, 630 and 640. An extra column and row cell was added to insert placeholders 675 and 655 using the CSU placeholder objects. The vertical CSU row column object, which is the only child of the page, includes five cells labeled 665, 690, 670, 685, and 680 on FIG. 6b. Three of the cells, cells 665, 670 and 680, store placeholding objects.

Geometry Management System Implementation

In one embodiment, the geometry management system is implemented with a plurality of objects in an object oriented program. Although the following objects provide a framework to implement the geometry management system, any apparatus, including any software program running on a computer system, that performs the functions described herein may be substituted without deviating from the spirit and scope of the invention. For this embodiment, the geometry management system is implemented with an ISU page, ISU object, ISU layout management, ISU container, ISU container event, ISU geometry manager, CSU container, and CSU geometry manager objects. Furthermore, as described above, the geometry management system contains built-in objects for geometry management. However, the framework of the geometry management system permits implementation of user-defined geometry management objects.

The ISU page object controls the management of pages with views. The ISU page object contains a ManagerView attribute. The ManagerView attribute indicates which view, among the views observing a page, manages the geometry of the page.

Table 2 includes interfaces, attributes, and methods for one implementation of the ISU object.

TABLE 2

ISUObject
Interface
    SU Geometry Result
        SU Geometry Yes
        SU Geometry No
        SU Geometry Almost
    SU Distance Min Max
        SU Distance Current
        SU Distance Infinite
    SU Geometry
        Left, Top, Width, Height
Attributes
    Layout Constraints
    Is Managed
    Outer Left, Outer Top, Outer Width, Outer Height
    Inner Left, Inner Top, Inner Width, Inner Height
    Outer Width Min, Outer Height Min, Outer Width Max, Outer Height Max
    Inner Width Min, Inner Height Min, Inner Width Max, Inner Height Max
Methods
    Query Geometry
    Take Geometry The layout constraints attribute, which is an attribute set by the parent container object when a child object is added to it, provides a way for storing container/geometry manager specific attributes within a child object. The IsManaged attribute determines whether the child is geometry managed by the parent of the child. Only the managed children, indicated by the IsManaged attribute, figure into the layout management scheme of the parent container. Containers do not geometry manage child objects of another container.

The dimension attributes (e.g. OuterWidthMin, OuterHeightMin, OuterWidthMax, etc.) determine the minimum and maximum dimensions of an object. In response to attempts to set outer and inner, minimum or maximum size-related attributes, an object directly updates these attributes. After updating the attributes, the object determines if the current size is out of the new range. If it is, the object calls set attribute calls to bring the dimensions within the permissible range. For example, if OuterWidth is "50" and OuterWidthMin is "40", and if an object called set OuterWidthMin. with "60", then the object updates the state with the new value of OuterWidthMin, and it calls set OuterWidth with "60."

The ISU object contains QueryGeometry and TakeGeometry methods. The QueryGeometry method, which is usually called by a parent container or geometry manager, queries the preferred geometry of an object. The QueryGeometry takes an "intended" parameter, a "preferred" parameter, and a "result" parameter. If the intended parameter is null, then the ideal geometry is returned in the preferred parameter. If the intended parameter is not null, then the object evaluates the requested geometry to determine if it is acceptable. If it is, the object returns SUGeometryYes.

The valid fields of a SUGeometry structure are indicated by setting the Boolean valued members appropriately. For example, if the requester is only interested in querying about a preferred width, then the requester sets the width in the width fields. In response, the object returns SUGeometryNo if the suggested geometry is unacceptable. Note that the parent container may ignore the child object's opinion, and request that the child object take the geometry. In addition, the object may return SUGeometryAlmost if the object doesn't like the proposed geometry, but determines that a slight variation is acceptable. In this case, the suggested variation is returned in the preferred parameter, if it is not null. The geometry passed in and out of the preferred parameter is interpreted as outer positions and outer sizes.

The TakeGeometry method, which is usually called by the parent container/geometry manager, asks an object to take a geometry without asking further questions. The TakeGeometry method passes the geometry. In response to this call, the object updates the state to reflect the new geometry (e.g. the TakeGeometry method is the only call that requires the child object to update the geometry).

Table 3 includes interfaces, attributes, and methods for one implementation of the ISULayoutManagement object.

TABLE 3

ISULayout Management
InterfaceISULayoutManagement: IUknown
Attributes
    Is Managing
Methods
    Request Geometry
    Resized
    ManagedSetChanged As shown in Table 3, the ISULayoutManagement object contains the RequestGeometry, Resized, and ManagedSetChanged methods. The RequestGeometry method is typically called by the child object of a parent container to request a new geometry. The ISULayoutManagement object receives an indication of the child object and the requested geometry, and it returns a reply geometry and a result. If the geometry is approved by the parent container, then the container sets the result return value to SUGeometryYes. Before returning the parameter, the parent container calls the TakeGeometry method of the child object to actually implement the change. The parent container returns SUGeometryNo if the requested geometry is unacceptable. In addition, a container may return SUGeometryAlmost if the container determines that the requested geometry is unacceptable, but prefers a slight variation thereof. The suggested variation is returned in the reply parameter of the RequestGeometry method if the reply parameter is not null. The geometry values passed in and out of the RequestGeometry method are interpreted as outer positions and sizes.

The Resized method performs re-layout of child objects based on the current geometry of the container. Containers call the Resized method from their implementation of ISU object: TakeGeometry after updating their internal state with their new geometry. Containers and geometry managers call the Resized method when their IsManaging attribute is changed from false to true. The ManagedSetChanged method performs the re-layout of the child objects based on the new managed set. The ManagedSetChanged method is called when the IsManaged flag of a child object changes, or when a new child is created with IsManaged flag set to true. For this implementation, the container is responsible for monitoring such situations, and it calls the ManagedSetChanged method when required. The base class container, CSU container, provides a default implementation of this functionality.

Table 4 shows the interface, attributes and methods for one implementation of the ISU container object.

TABLE 4

ISUContainer
Interface
    SUContainerEmptyActionType
Attributes
    Configurable
    ISUGeometryManager
    IOMArray TABLE 4-continued

| | |
|---|---|
| Methods | SUContainerEmptyActionType |
| | GetChildposition |
| | AddChild |
| | AddChildren |
| | DeleteChild |
| | DeleteChildren |
| | MoveChild |

The ISU container methods, GetChildPosition, AddChild, AddChildren, DeleteChild, DeleteChildren, and MoveChild, provide functionality for a parent container to obtain child object information as well as provide functionality to manage child objects. The configurable attribute is used to determine if the container supports dynamic binding to an external geometry manager via the ISUGeometryManager attribute. The SUContainerEmptyActionType attribute determines what action to take when a container becomes empty.

Table 5 shows the methods for one implementation of the ISU ContainerEvent.

TABLE 5

| | |
|---|---|
| ISUContainerEvent | |
| Methods | |
| | (RequestAddChild) |
| | (RequestDeleteChild) |
| | (BeforeAddChild) |
| | (BeforeDeleteChild) |
| | (OnAddChild) |
| | (OnDeleteChild) |

The ISUContainer provides functions to add and delete child objects to and from containers. The ISUContainerEvent is a mechanism for other objects to take actions when a child is added or deleted from a container. The ISUGeometryManager includes a Draw method. The Draw method is called by a container when the draw method of the container is called.

Tables 6 and 7 show details of CSUContainer and CSUGeometryManager, respectively.

TABLE 6

| | |
|---|---|
| CSUContainer | |
| Class | |
| | CSUContainer:CSUObject |
| Interface | |
| | ISUContainer |
| | ISULayoutManagement |
| SubscribeEvent | |
| | IOMPropertyNotifySink |
| | ISUContainerEvent |
| PublishEvent | |
| | ISUContainerEvent |

TABLE 7

| | |
|---|---|
| CSUGeometryManager | |
| Class | |
| | CSUGeometryManager |
| Interface | |
| | ISUGeometryManager |
| | ISULayoutManagement |
| | ISUDropTarget |

TABLE 7-continued

| | |
|---|---|
| SubscribEvent | |
| | IOMPropertyNotifySink |
| | ISUContainerEvent |

Computer System

Figure 7:
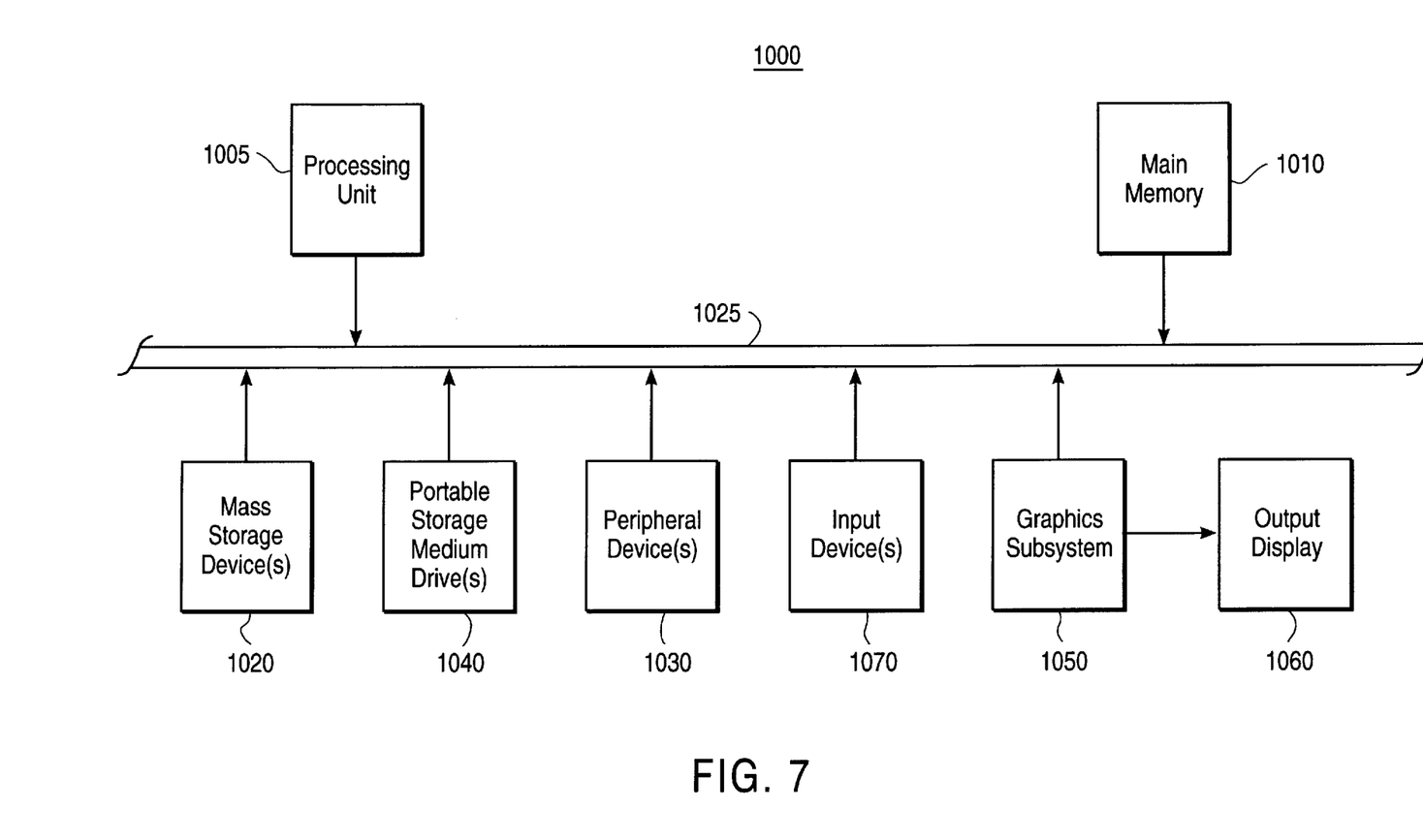
FIG. 7 illustrates a high level block diagram of a general purpose computer system in which the geometry management system of the present invention may be implemented.

FIG. 7 illustrates a high level block diagram of a general purpose computer system in which the geometry management system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the geometry management system of the present invention is wholly or partially implemented in software, then the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 7 as being connected via the bus 1025. However, the computer system 1025 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the geometry management system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the geometry management system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the tools or editors may be input to the computer system 1000 via a portable storage medium or a network for processing by the geometry management system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The geometry management system may be implemented in either hardware or software. For the software implementation, the geometry management system is software that includes a plurality of computer executable instructions for implementation on a general purpose computer system. Prior to loading into a general purpose computer system, the geometry management system software may reside as encoded information on a computer readable medium, such as a magnetic floppy disk, magnetic tape, and compact disc read only memory (CD-ROM). In one hardware implementation, the geometry management system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for managing geometric relationships among a plurality of objects for display on an output display, said method comprising the steps of:

managing spatial relationships for at least one object in accordance with a high level geometry management policy;

binding said high level geometry management policy to a graphical configurable container that defines a geometric shape for encapsulating said object, wherein said high level geometry management policy is independent of said geometric shape of said graphical configurable container; and displaying said object, encapsulated in said geometric shape of said graphical configurable container, on said output display in accordance with said high level geometry management policy.

2. The method as set forth in claim 1, further comprising the step of managing spatial relationships for a plurality of graphical configurable containers in accordance with said high level geometry management policy.

3. The method as set forth in claim 1, wherein said graphical configurable container comprises a geometric shape including a polygon, arcs, and an ellipse.

4. The method as set forth in claim 1, wherein the step of managing spatial relationships for said object further comprises the step of managing spatial relationships of said object in a plurality of rows and columns to form a matrix.

5. The method as set forth in claim 1, further comprising the step of generating, in response to user input, a placeholder object to define relative spacing among one or more objects.

6. The method as set forth in claim 1, further comprising the steps of:

displaying, in accordance with said high level geometry management policy, said graphical configurable container and said object in a frame window; and resizing said frame window such that said graphical configurable container is re-sized in accordance with said high level geometry management policy and said graphical configurable container resize, as necessary, said object encapsulated therein.

7. The method as set forth in claim 1, further comprising the step of resizing said object such that said graphical configurable containers are resized, if necessary, to accommodate said object in accordance with said high level geometry management policy.

8. The method as set forth in claim 7, wherein the step of resizing said object comprises the steps of:

generating, in response to resizing of an object, a request from said object to obtain a new geometry including specifying a preference to accommodate said resizing;

determining an acceptable geometry for said object in accordance with said graphical configurable container and said high level geometry management policy; and implementing said acceptable geometry for said object.

9. The method as set forth in claim 1, wherein the step of managing spatial relationships for said object in accordance with a high level geometry management policy comprises the step of managing spatial relationships to fully display said object in said graphical configurable container.

10. The method as set forth in claim 9, wherein the step of managing spatial relationships for said object comprises the step of managing spatial relationships of said object in a single row or column.

11. A method for designing a computer readable geometry managed form comprising a plurality of objects encapsulated therein for display on an output display, said method comprising the steps of:

displaying a plurality of cells on said output display such that said cells provide visual placeholders for configurable containers that encapsulate at least one object, wherein spatial relationships for said configurable containers are managed in accordance with a high level geometry management policy to define geometric relationships among said cells; and providing a drag and drop operation for a user to permit a user to place objects in said cells to specify geometric constraints among objects in said form.

12. The method as set forth in claim 11, wherein the step of displaying a plurality of cells comprises the step of displaying at least two cells adjacent to form a row or column.

13. The method as set forth in claim 12, further comprising the step of displaying, adjacent to an end cell in a row or column, a header cell to permit a user to align objects placed in cells in said corresponding row or column.

14. The method as set forth in claim 11, further comprising the step of displaying said form at run time to uphold said geometric constraints specified at design time.

15. A computer system comprising:

an input device for receiving user input;

an output display for displaying a plurality of objects;

a processor unit for executing a plurality of instructions to display objects on said output display, said instructions including:

a container object for generating, in response to user input, at least one graphical container to encapsulate at least one of said objects and for managing spatial relationships for said objects being encapsulated; and a geometry manager for implementing a high level geometry management policy, and for attaching, in response to user input, said geometry manager to said object container to manage said at least one graphical container independent of said container object.

16. A computer readable medium having a set of instructions stored therein, which when executed by a computer, causes the computer to perform the steps of:

managing spatial relationships for at least one object in accordance with a high level geometry management policy;

binding said high level geometry management policy to a graphical configurable container that defines a geometric shape for encapsulating said object, wherein said high level geometry management policy is independent of said geometric shape of said graphical configurable container; and displaying said object, encapsulated in said geometric shape of said graphical configurable container, on said output display in accordance with said high level geometry management policy.

17. The computer readable medium as set forth in claim 16, further comprising instructions for managing spatial relationships for a plurality of graphical configurable containers in accordance with said high level geometry management policy.

18. The computer readable medium as set forth in claim 16, wherein the instructions for encapsulating at least object in a graphical configurable container comprises instructions for generating a geometric shape including a polygon, arcs, and an ellipse.

19. The computer readable medium set forth in claim 16, wherein the instructions for managing spatial relationships for said object further comprises instructions for managing spatial relationships of said object in a plurality of rows and columns to form a matrix.

20. The computer readable medium as set forth in claim 16, further comprising instructions for generating, in response to user input, a placeholder object to define relative spacing among one or more objects.

21. The computer readable medium set forth in claim 16, further comprising instructions for:

displaying, in accordance with said high level geometry management policy, said graphical configurable container and said object in a frame window; and resizing said frame window such that said graphical configurable container is re-sized in accordance with said high level geometry management policy and said graphical configurable container resizes, as necessary, said object encapsulated therein.

22. The computer readable medium set forth in claim 16, further comprising instructions for resizing said object such that said graphical configurable containers are resized, if necessary, to accommodate said object in accordance with said high level geometry management policy.

23. The computer readable medium set forth in claim 22, wherein instructions for resizing said object comprise instructions for:

generating, in response to resizing of an object, a request from said object to obtain a new geometry including specifying a preference to accommodate said resizing;

determining an acceptable geometry for said object in accordance with said graphical configurable container and said high level geometry management policy; and implementing said acceptable geometry for said object.

24. The computer readable medium set forth in claim 16, wherein instructions for managing spatial relationships for said object in accordance with a high level geometry management policy comprises instructions for managing spatial relationships to fully display said object in said graphical configurable container.

25. The computer readable medium set forth in claim 24, further comprising instructions for managing spatial relationships of said object in a single row or column.

* * * * *